INVENTOR
Armand Brandt

BY Pierce, Scheffler & Parker
ATTORNEYS

United States Patent Office 2,873,419
Patented Feb. 10, 1959

2,873,419

ARC-BACK PREVENTION CIRCUIT

Armand Brandt, Wettingen, Switzerland, assignor to Aktiengesellschaft Brown, Boveri & Cie, Baden, Switzerland, a joint-stock company Application September 21, 1956, Serial No. 611,235

Claims priority, application Switzerland September 22, 1955

7 Claims. (Cl. 321—48)

This invention relates generally to arc-back prevention means, and more particularly to means for preventing arc-back in a contact converter system upon the reduction of voltage in the primary power supply line.

It is known that a voltage drop in the primary power line due to a counter voltage in the contact converter load (as might occur, for example, in an electrolysis system), when it is large enough, will cause a reverse current flow and an accompanying arc-back in the system.

The contact converter is put out of operation for a rather lengthy period of time for each arc-back, since the contacts to the protective network are bridged through short circuit, the primary switch is triggered, and the cause of the breakdown must be established. The resulting interruption in production is not to be underestimated, especially in an electrolysis system. The prevention of arc-back upon a primary voltage drop in the contact converter therefore is of special importance from an operating standpoint.

The primary object of the invention therefore is to provide an arrangement for the prevention of arc-back in a contact transformer upon a voltage drop in the primary power line.

The invention is characterized in that a D.-C. circuit including a choke coil having an iron core is utilized and a premagnetization winding is provided which counteracts the magnetization of the operating current and whereby $$F.w \geq \frac{U_n(\alpha-\beta)t.10^8}{2B}$$

so that a reverse current is prevented at least for the time period of the contact opening.

Figure 1:
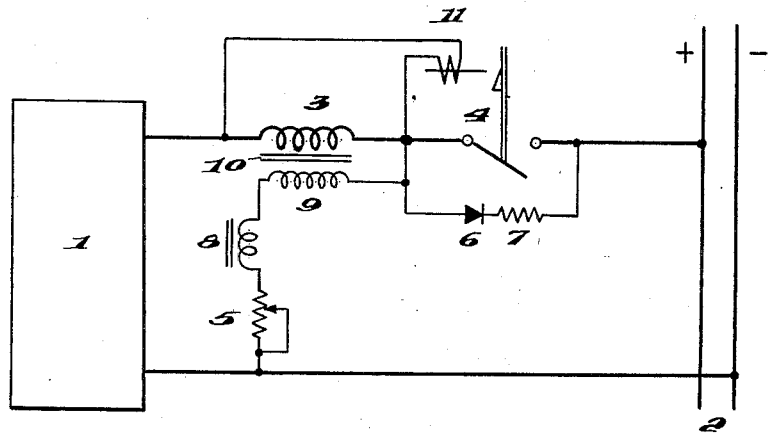
Figure 2:
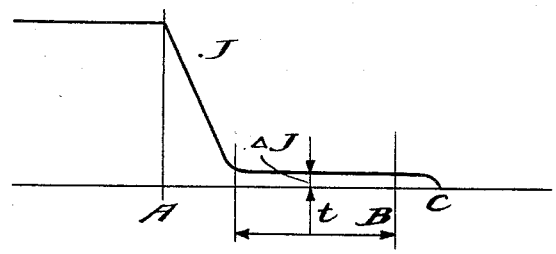

Other objects and advantages of the invention will become more apparent from a study of the following specification when considered in conjunction with the accompanying drawings, in which Fig. 1 is a schematic diagram of the electric circuit; and Fig. 2 is a graph of the voltage versus time during system operation.

Referring now to Fig. 1, the contact converter 1 supplies D.-C. power to the bus bars 2 through a choke coil 3 having an iron core 10 and through the D.-C. switch 4. The choke coil winding 3 is magnetically coupled to the premagnetization winding 9, which is arranged with a current limiting resistor 5 and a separate choke coil 8 in such a manner with respect to the converter D.-C. voltage that the choke coil 3 is magnetized in opposition to the operating current. The premagnetization winding 9 and the resistor 5 will be effectively so designed that the converter requires no ground load, since the resistor 5 is designed to function as the ground load for the converter. The supply of the premagnetization winding can also be produced by means of a constant auxiliary D.-C. voltage.

The following quantities are decisive for the dimensioning of the choke coil 3:

Switch characteristic time $= t$ $\dfrac{\text{Inverse potential of the electrolysis}}{\text{Rated D.-C. voltage of the converter}} = \alpha$ $\dfrac{\text{Power line voltage during the greatest drop}}{\text{Rated power line voltage}} = \beta$ Rated D.-C. voltage of the converter $= U_n$
Maximum induction in the region of the saturation bend $= B$ The capacity of the coil is a result of the product of the winding turns $w$ and the iron cross-section $F$. The coil is designed according to the formula $$F.w \geq \frac{U_n(\alpha-\beta)t.10^8}{2B}$$

The release coil 11 of the switch 4 is connected in parallel with the choke coil 3. Further in parallel with the switch is a rectifier 6 and a resistor 7 for the purpose of spark suppression.

The method of operation of the invention is as follows:

Upon a drop in voltage in the primary power line the output voltage from the converter decreases a like amount. Upon reduction of the D.-C. output voltage below the polarization voltage of the bus bar of the affiliated electrolysis system, the converter will first of all be completely discharged and the apparatus of the instant invention will prevent the inverse current flow. In view of the direct current premagnetization of the D.-C. current choke coil 3 by the discharge of the converter, a demagnetization of the regulating coil iron occurs, so that the commencement of the inverse current is delayed. The resulting voltage impulse occurring in the choke coil 3 releases the D.-C. current switch 4 by the release coil 11. This release occurs during the release time $t$ which is limited through the mechanical inertia of the switch. By means of the above described dimensioning of the arc-back control choke coil 3, the commencement of the reverse current will be delayed at least until the disconnection of the D.-C. current switch. Thus another advantage of the invention is apparent in that the D.-C. switch opens practically without current and correspondingly requires but little. By means of the rectifier 6 and the series resistance 7, arc-back on the switch will be prevented while the contacts are separated.

In Fig. 2 the curve of the D.-C. current J is plotted against time. The voltage drop occurs at time A and the interruption through the D.-C. switch occurs at time B. After this interruption the rectifier 6 conducts temporarily until the current reaches the zero point C and limits the voltage which occurs between the contacts of the D.-C. switch. Thus the additional advantage is shown that the distance between the contacts of the D.-C. switch by the instant arrangement may be smaller than that previously required. The D.-C. switch may be provided with automatic resetting means so that the short time of interruption of the current supply for the electrolysis will require hardly any attention from the shop operators.

The choke coil 3 is preferably constructed as a tubular choke with tubular conductors concentrically arranged about the circular center. A high permeability material is preferably employed for the central core so that a small delay of the current increment $\Delta J$ will be obtained.

While in accordance with the provisions of the statutes I have illustrated and described the best form of embodiment of my invention known to me, it will be apparent to those skilled in the art that changes may be made in the form of the embodiment described without departing from the spirit of my invention as set forth in the appended claims.

I claim:
1. In an electrolysis system wherein a contact converter supplies direct current to power mains through a direct current switch, means for preventing arc-back upon the reduction of voltage in the supply mains to the converter comprising a choke coil connected in series with the switch, said choke coil being premagnetized in a direction to counteract the operating current normally passing therethrough and having an inductive capacity designed according to the formula

$$Fw \geqq \frac{U_n(\alpha-\beta)t \cdot 10^8}{2B}$$

where $F$ = iron cross-section
$w$ = winding turns
$U_n$ = rated direct current voltage of the converter
$\alpha$ = ratio of the inverse potential of the electrolysis to the rated direct current voltage of the converter
$\beta$ = ratio of the power line voltage during the greatest drop to the rated power line voltage
$t$ = switch characteristic time
$B$ = maximum induction in the region of the saturation bend, said choke coil producing an inductive pulse which temporarily prevents passage of the arc-back current to the converter upon the lowering of the supply voltage, until the coil is completely demagnetized, and means associated with said choke coil for opening the direct current switch within the period of demagnetization of said choke coil.

2. Apparatus as defined in claim 1 wherein said means for opening the direct current switch comprises a switch-disconnecting-coil connected in parallel with said choke coil.

3. Apparatus as defined in claim 1 wherein said choke coil has a core of high permeability iron and wherein the choke coil comprises a winding of concentric tubular conductors wound upon said core.

4. Apparatus as defined in claim 1, wherein the premagnetizing current of the choke coil is discharged to a constant booster current source.

5. Apparatus as defined in claim 1, wherein a rectifier is positioned in parallel with the D.-C. current switch.

6. Apparatus as defined in claim 1, wherein the premagnetization current of the choke coil is discharged directly from the converter through a current limiting resistor.

7. Apparatus as defined in claim 6, wherein the current limiting resistance is the ground load for the converter.

References Cited in the file of this patent

UNITED STATES PATENTS

| | | |
|---|---|---|
| 1,545,754 | Golladay | July 14, 1925 |
| 1,873,087 | Wensley | Aug. 23, 1932 |
| 1,920,745 | Grunbolz | Aug. 1, 1933 |
| 2,677,092 | Schmidt | Apr. 27, 1954 |
| 2,683,850 | Weber et al. | July 13, 1954 |